US006773539B2

(12) United States Patent
Mertens et al.

(10) Patent No.: US 6,773,539 B2
(45) **Date of Patent: *Aug. 10, 2004**

(54) METHOD FOR ADHERING LINERLESS REPOSITIONABLE SHEETS ONTO ARTICLES

(75) Inventors: Timothy A. Mertens, Woodbury, MN (US); Alden R. Miles, Lakeville, MN (US); Mark G. Gjertson, Newport, MN (US); Melvin R. Collins, Power Springs, GA (US); Nora J. Grayson, Dallas, GA (US); Dennis L. Luense, Acworth, GA (US)

(73) Assignee: 3M Innovative Properties Company, St. Paul, MN (US)

( * ) Notice: Subject to any disclaimer, the term of this patent is extended or adjusted under 35 U.S.C. 154(b) by 201 days.

This patent is subject to a terminal disclaimer.

(21) Appl. No.: 09/996,155

(22) Filed: Nov. 28, 2001

(65) Prior Publication Data

US 2002/0034602 A1 Mar. 21, 2002

Related U.S. Application Data

(62) Division of application No. 09/443,430, filed on Nov. 19, 1999, now Pat. No. 6,352,751, which is a continuation of application No. 08/729,780, filed on Oct. 8, 1996, now Pat. No. 6,383,591.

(60) Provisional application No. 60/020,724, filed on Jun. 21, 1996.

(51) Int. Cl.$^7$ .......... B32B 31/04

(52) U.S. Cl. .......... 156/277; 156/64; 156/256; 156/353; 156/521

(58) Field of Search .......... 156/64, 256, 277, 156/353, 354, 361, 387, 521; 428/40.1

(56) References Cited

U.S. PATENT DOCUMENTS 3,341,390 A 9/1967 Kirk .......... 156/511
3,560,299 A 2/1971 Schneider .......... 156/351

(List continued on next page.)

FOREIGN PATENT DOCUMENTS

AU 41632/93 1/1994
EP 0 081 963 A2 12/1982

(List continued on next page.)

OTHER PUBLICATIONS

A Study in Machine Development, *Modern Packaging*, vol. 33, pp. 201–207, Mar. 1960.

(List continued on next page.)

*Primary Examiner*—Melvin C. Mayes
(74) *Attorney, Agent, or Firm*—Carolyn V. Peters; George W. Jonas

(57) ABSTRACT

A method for sequentially and precisely registering cut sheets for application onto advertising signatures at high speeds employs an initial roll of sheeting material. The sheeting material is unwound to track a process path, where eyemarks on the sheeting material are detected for use in registering the sheeting material to be cut into discrete sheets and to be aligned with a moving advertising signature for affixation thereto. The sheeting material has a repositionable pressure sensitive adhesive along one side edge thereof for use in adhering the cut sheet to the advertising signature. In one embodiment, the sheeting material is generally opaque adjacent one side edge and is sufficiently transparent adjacent its other side edge so that when a sheet cut from the sheeting material is adhered to an advertising signature, images on the advertising signature are visible through at least a portion of the sheet.

14 Claims, 6 Drawing Sheets

U.S. PATENT DOCUMENTS

| | | | | | |
|---|---|---|---|---|---|
| 3,691,140 | A | | 9/1972 | Silver | 260/78.5 |
| 3,713,948 | A | | 1/1973 | Kluger | 156/351 |
| 3,751,324 | A | | 8/1973 | Enskat | 156/521 |
| 3,806,395 | A | | 4/1974 | French | 156/497 |
| 3,857,731 | A | | 12/1974 | Merrill, Jr. et al. | 177/122 PA |
| 3,883,380 | A | | 5/1975 | Kirk et al. | 156/60 |
| 3,883,385 | A | | 5/1975 | Kirk et al. | 156/352 |
| 4,124,435 | A | | 11/1978 | Stump et al. | 156/521 |
| 4,166,152 | A | | 8/1979 | Baker et al. | 428/522 |
| 4,314,869 | A | | 2/1982 | Crankshaw | 156/215 |
| 4,354,894 | A | | 10/1982 | Lewis et al. | 156/517 |
| 4,421,587 | A | | 12/1983 | Guenther et al. | 156/256 |
| 4,491,498 | A | | 1/1985 | Harris et al. | 156/497 |
| 4,521,267 | A | | 6/1985 | Jacobson | 156/249 |
| 4,589,943 | A | | 5/1986 | Kimball et al. | 156/256 |
| 4,707,211 | A | | 11/1987 | Shibata | 156/354 |
| 4,784,714 | A | | 11/1988 | Shibata | 156/354 |
| 4,786,696 | A | | 11/1988 | Bohnel | 526/88 |
| 4,840,696 | A | | 6/1989 | Krasuski et al. | 156/353 |
| 4,842,303 | A | | 6/1989 | Molenda | 281/38 |
| 4,886,566 | A | | 12/1989 | Peyre | 156/361 |
| 4,907,825 | A | | 3/1990 | Miles | 283/81 |
| 4,978,415 | A | | 12/1990 | Jones | 156/517 |
| 4,980,212 | A | | 12/1990 | Marquis | 428/194 |
| 4,988,567 | A | | 1/1991 | Delgado | 428/402 |
| 4,994,322 | A | | 2/1991 | Delgado et al. | 428/343 |
| 5,045,569 | A | | 9/1991 | Delgado | 521/60 |
| 5,068,004 | A | | 11/1991 | Moll | 156/494 |
| 5,154,962 | A | | 10/1992 | Mertens | 428/40.1 |
| 5,236,535 | A | | 8/1993 | Smith | 156/250 |
| 5,283,091 | A | | 2/1994 | Darvell | 428/41.6 |
| 5,332,265 | A | | 7/1994 | Groess | 283/81 |
| 5,370,916 | A | * | 12/1994 | Olsen | 428/40.1 |
| 5,382,055 | A | | 1/1995 | Mertens et al. | 283/67 |
| 5,431,763 | A | | 7/1995 | Bradshaw | 156/256 |
| 5,476,698 | A | | 12/1995 | Denny | 428/41.9 |
| 5,980,676 | A | * | 11/1999 | Meetze | 156/216 |
| 6,063,225 | A | | 5/2000 | Riordan | 156/250 |
| 6,268,032 | B1 | * | 7/2001 | Mertens et al. | 428/40.1 |
| 6,352,751 | B1 | * | 3/2002 | Miles et al. | 428/40.1 |
| 6,379,764 | B1 | * | 4/2002 | Pusateri et al. | 428/40.1 |

FOREIGN PATENT DOCUMENTS

| | | | |
|---|---|---|---|
| EP | 0 220 707 | A2 | 10/1986 |
| EP | 0 370 642 | A1 | 10/1989 |
| EP | 0 646 529 | A2 | 4/1995 |
| GB | 2 212 133 | A | 7/1989 |

OTHER PUBLICATIONS

U.S. patent application Ser. No. 08/343,630, filed Nov. 22, 1994, Riordan, "Tape Roll Structure for Use in Making Marginal Edge Tabs for Sheets" (claiming priority from Ser. No. 07/583,784, filed Sep. 17, 1990).

3M Media Networks, "Direct Response—A Direct Line to Your Prospects," advertising folio and inserts(22 pages) (1992).

Drawing used to place Post–it™ brand notes on backer cards (dated May 23, 1993).

U.S. patent application Ser. No. 08/963,147, filed Nov. 3, 1997, Pusateri et al., "Method and Apparatus for Placing Linerless Repositionable Sheets Directly onto Advertising Signatures" (claiming priority from Ser. No. 08/095,722, filed Jul. 21, 1993).

3M Media Networks, "Direct Response Products—We Make Your Message Stick," advertising folio and inserts (12 pages) (1995).

Fourth Information Disclosure Statement and accompanying Trade Secret materials, filed in patent application Ser. No. 08/729,780, mailed Sep. 25, 1997.

* cited by examiner

METHOD FOR ADHERING LINERLESS REPOSITIONABLE SHEETS ONTO ARTICLES

CROSS REFERENCE TO RELATED APPLICATIONS

This application claims priority from U.S. Provisional Patent application No. 60/020,724, filed on Jun. 21, 1996, for "Method and Apparatus for Adhering Linerless Repositionable Sheets onto Articles," by Alden R. Miles et al.; U.S. patent application Ser. No. 08/729,780, filed on Oct. 8, 1996, for "Method and Apparatus for Adhering Linerless Repositionable Sheets onto Articles," by Alden R. Miles et al., now U.S. Pat. No. 6,383,591, and U.S. patent application Ser. No. 09/443,430, filed on Nov. 19, 1999, for "Method and Apparatus for Adhering Linerless Repositionable Sheets onto Articles," by Alden R. Miles et al, now U.S. Pat. No. 6,352,751.

BACKGROUND OF THE INVENTION

It is well known to including advertising insert cards ("blow-ins") with no adhesive in magazines for promotional purposes. These insert cards simply sit between pages loosely and may fall out when the magazine is read. Typically, such insert cards are in the form of a postcard for the reader to complete and return.

Repositionable sheets, such as the POST-IT® brand notes sold by Minnesota Mining and Manufacturing Company of St. Paul, Minn., are quite common and in every day use. Such sheets in familiar form are available in stacks or pads of sheets, one adhered to another. Such repositionable sheets have a first side which is partially coated with a repositionable pressure sensitive adhesive (RPSA) and a second side which is either plain (no printing) for writing a note, or which may have a preprinted message or design thereon. Such repositionable sheets are useful for calling attention to a particular section of a document, for marking pages in documents or books, or for leaving removable and repositionable notes that can be adhered to just about any clean surface.

The utility of placing a repositionable sheet on an advertising signature, flyer, newspaper, magazine, etc. has also been noted. An advertising signature is an insert that is placed in a magazine and comprises a plurality of pages, typically rectangular pieces of paper having advertising printed thereon and being folded over to form a registration edge. When placed in a magazine, the advertising signature is bound to the other magazine pages along the registration edge. Advertising signatures have been provided with repositionable labels that contain information such as the name and telephone number of the advertiser or a coupon for a price discount. The labels are repositionable so that they can be removed from the advertising signature and adhered at another location (for example, a desk or refrigerator) to remind the reader to call the advertiser or to use the coupon at a later date.

Many of such labels that have been placed on advertising signatures have a repositionable pressure sensitive adhesive (RPSA) coated over the entire back side of the label. Labels that have RPSA coated over their entire back side are typically carried on a liner before being adhered to an advertising signature. The labels on the liner are supplied to an apparatus which separates the label from the liner and adheres the label to an advertising signature. The label is typically separated from the liner by a peeler bar, and the label is subsequently adhered to a substrate (that could be an advertising signature), typically by a blast of air. The liner, which previously supported the label, often is rewound on a take-up reel and subsequently discarded as waste. These methods and apparatus have drawbacks in that they generate waste in the form of a useless liner, require additional equipment on the apparatus to remove the label and store the liner (for example, a peeler bar and take-up reel), and use excess quantities of adhesive by having the entire back side of the label coated with RPSA.

In another approach to promote an advertisement in an advertising signature, a backer card is employed to secure a repositionable, information-containing sheet to an advertising signature. See U.S. Pat. No. 4,842,303, incorporated herein by reference. The backer card has a registration edge which is aligned with the registration edge of the advertising signature. The repositionable sheet of paper has a narrow band of RPSA coated on one surface adjacent to an edge of the repositionable sheet. The repositionable sheet is adhered along the registration edge of the backer card by the narrow band of RPSA. The combination backer card and repositionable sheet is secured to an advertising signature by gluing the backer card to the advertising signature using, for example, a tipping machine.

Although the approach disclosed in U.S. Pat. No. 4,842,303 employs an information-containing sheet which only uses a narrow band of RPSA, it too has a number of drawbacks. One drawback is the need to employ a backer card to secure the repositionable sheet to an advertising signature. Another drawback is the need for a number of additional process steps to assemble the combination backer card/repositionable sheet before it is attached to an advertising signature. The additional process steps that have been used include: laminating the adhesive bearing sheet and backer card together in registry; cutting the laminated webs to a master sheet size (typically, 8.5 by 12 inches); stacking the cut master sheets; jogging the master sheets; cutting them into conventional sizes (for example, 4 inches by 6 inches); stacking the cut laminated sheets; and then shipping them to an inserter for attachment to an advertising signature.

It is believed that the only publicly known method for directly applying linerless repositionable preprinted sheets having a band of adhesive thereon directly onto articles such as magazines or advertising signatures is by manual means. A previous method and apparatus for an automated application of such sheets is disclosed in co-pending U.S. patent application Ser. No. 08/963,147, which is a divisional of U.S. patent application Ser. No. 08/095,722, now abandoned, commonly owned by the assignee of the instant application, Minnesota Mining and Manufacturing Company, St. Paul, Minn., and incorporated herein by reference. In that disclosure, a supply roll of paper for forming such sheets is incrementally dispensed, cut by a reciprocating knife, and then transported to a flat vacuum plate, which first held the cut sheet by forming a vacuum and then blew the RPSA side of the cut sheet onto an advertising signature. In this arrangement, a series of indicia (i.e., "eyemarks") printed on the RPSA side of the sheet material were detected to control the movement of the sheet material through the apparatus and its alignment relative to its respective advertising signature. The locational placement of the cut sheet relative to the advertising signature is referred to as its registration. At the highest speeds possible with this equipment (e.g., 3,000 articles processed per hour), this prior art apparatus did not provide as precise a placement or registration of the cut sheet on sequential advertising signatures as desired.

SUMMARY OF THE INVENTION

The present invention relates to a new method and apparatus for applying adhesive sheets directly to an advertising signature or other article. Initially, the sheets are provided in roll form for processing and application. In one embodiment, a roll of sheet material is elongated longitudinally, has first and second opposed sheet surfaces and first and second opposed side edges. A pressure sensitive adhesive extends in a predetermined pattern on only a first adhesive portion of the first surface of the sheet material, adjacent the first side edge thereof. The sheet material, adjacent its first side edge and including the first adhesive portion, is formed from a material that is sufficiently transparent when adhered to a substrate that underlying images on the substrate are substantially visible through the sheeting material. The sheet material also has a plurality of longitudinally spaced and detectable images disposed in predetermined locations on the first adhesive portion thereof. In an alternative embodiment, the sheet material in roll form is entirely opaque and has a plurality of equally-spaced, longitudinally disposed images printed on both sides thereof, with the images on the side bearing the pressure sensitive adhesive serving as registration means for use in processing the sheet material.

A method of sequentially adhering linerless sheets to a corresponding sequence of articles comprises supplying (a) an elongated linerless sheeting in wound roll form, with the sheeting having a first major side and an opposed second major side. A pressure sensitive adhesive coating partially covers the first side of the sheeting, while the second side of the sheeting is free of adhesive. (b) A leading portion of the elongated linerless sheeting is advanced along a process path until it reaches a cut station. (c) The leading portion of the linerless sheeting is laterally cut to define a first cut sheet having a first lead edge and a second trailing edge. (d) A vacuum platen having an arcuate circumferential surface is aligned in engagement with at least a portion of the second side of the first cut sheet adjacent the first lead edge thereof. (e) A negative pressure is drawn on a portion of the arcuate circumferential surface of the vacuum platen to affix the first cut sheet in the cut station thereto. (f) A first article having a face is advanced into an applicator station adjacent the vacuum platen. (g) The vacuum platen is moved to carry the first cut sheet from the cut station to the applicator station, whereby the first cut sheet is aligned for placement on the face of the first article. (h) The negative pressure on the arcuate circumferential surface is relieved to release the first cut sheet from the vacuum platen. (i) The vacuum platen is moved across the face of the article so that the pressure sensitive adhesive on the first side of the first cut sheet is pressed against the face of the article to bond the first cut sheet to the face of the article. Steps (b) and (c) are repeated to define a second cut sheet from the elongated linerless sheeting. Steps (d) and (e) are repeated with the vacuum platen relative to the second cut sheet. The second article having a face is advanced into the applicator station adjacent the vacuum platen. Steps (g), (h) and (i) are repeated with the second cut sheet to align, release from the vacuum platen and then press the second cut sheet against the face of the second article by the arcuate circumferential surface of the vacuum platen.

In one embodiment, the elongated linerless sheeting processed by the above-described method is light transmissive. Preferably, the light-transmissive sheeting has, on either side, a series of longitudinally disposed, equally spaced visual indicators, and the method further includes the step of detecting each visual indicator on the sheeting as it is advanced along the process path to generate a signal used for process control purposes.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention. It should be specifically noted that the figures have not been drawn to scale as it has been necessary to enlarge certain portions for clarity.

DETAILED DESCRIPTION OF THE PREFERRED EMBODIMENTS

In describing the preferred embodiments of the invention, specific terminology will be used for the sake of clarity. The invention, however, is not intended to be limited to the specific terms so selected, and it is to be understood that each term so selected includes all the technical equivalents that operate similarly.

Figure 1:
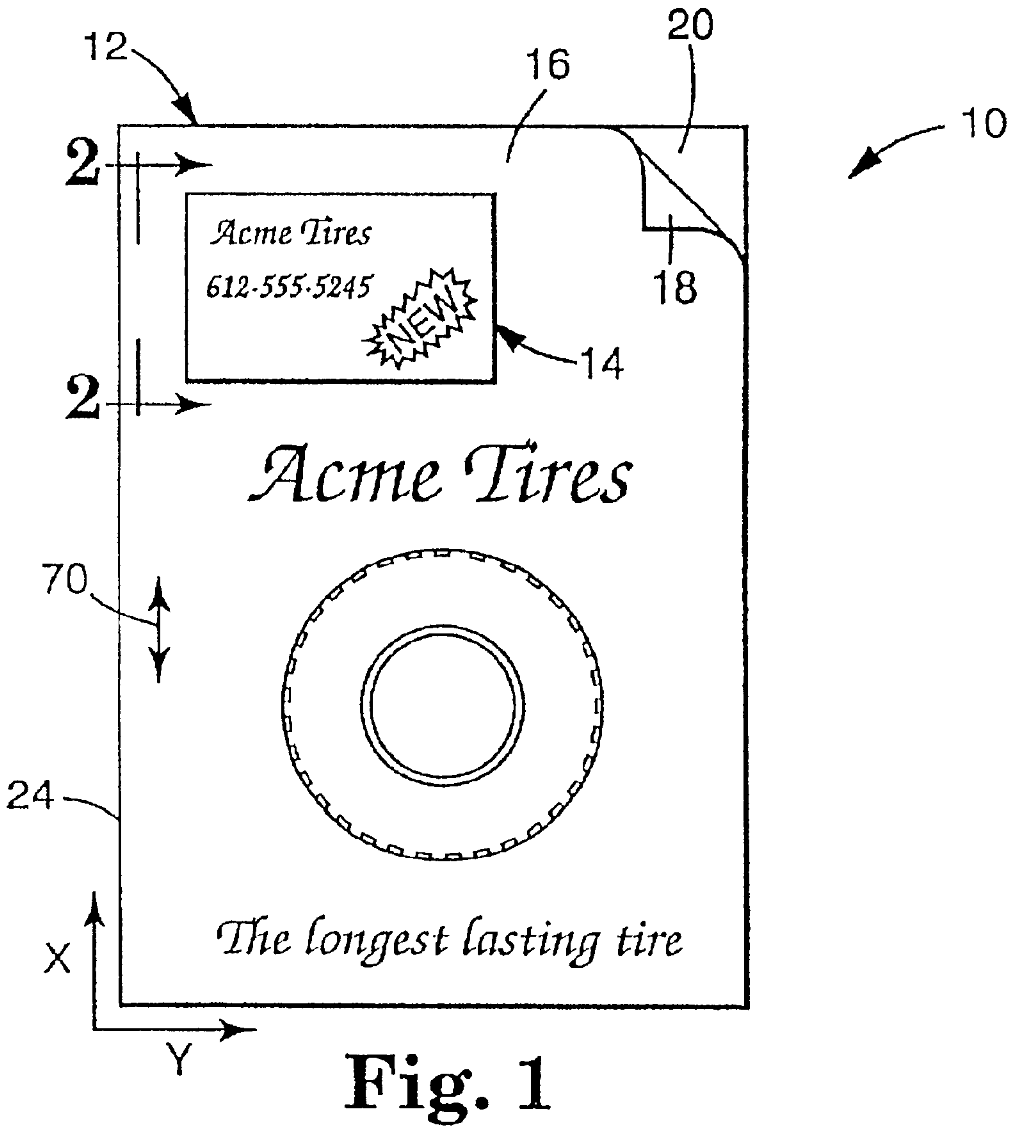
FIG. 1 is a front view of a multipage advertising piece 12 having a repositionable sheet 14 adhered to cover 16 thereof.
Figure 2:
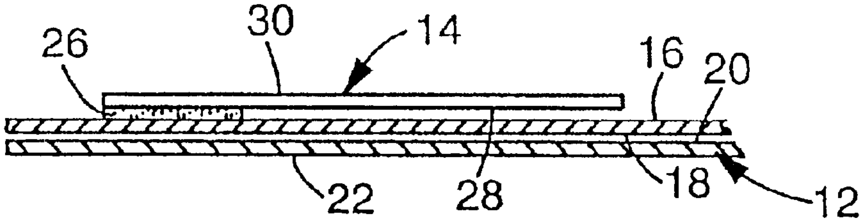
FIG. 2 is a sectional view as taken along lines 2—2 in FIG. 1.

FIGS. 1 and 2 illustrate a promotional assembly 10 that includes an advertising piece 12 and a repositionable sheet 14. The advertising piece shown has a plurality of pages: a first top page or cover 16, a second or opposite inside page 18, a third or juxtapositioned inside page 20, and a fourth or rear page 22. The pages 16, 18, 20 and 22 can be printed on a single sheet which is folded at 24. Additional pages can be provided by, for example, increasing the number of folded sheets. In other forms, the advertising piece 12 may comprise a single sheet or multiple sheets bound in some other manner (e.g., stapled or adhered together) or may even comprise a book, letter, product package, etc. For purposes of this application, it is only essential that the article receiving the repositionable sheet have a face (such as cover 16) suitable for the adherence of a repositionable sheet thereon.

The term "repositionable" means the sheet 14 can be adhered to and removed from a clean solid surface at least two times without substantially losing tack. Preferably, the sheet can be adhered to and removed from a clean solid surface at least ten and, more preferably, at least twenty times without substantially losing tack. The repositionable sheet 14 is secured directly to the advertising piece by RPSA 26 (FIG. 2), coated at least partially on a first or back side 28 of the sheet 14. The repositionable sheet 14 has a second or top side 30 onto which information can be printed (e.g., which corresponds to or further emphasizes information printed on the advertising piece 12). As illustrated, the repositionable sheet 14 can have the name and phone number of an advertiser printed on the top side 30 of the sheet 14.

A repositionable sheet suitable for this application can be a POST-IT® brand note sold by Minnesota Mining and Manufacturing Company, St. Paul, Minn. Each POST-IT® brand note includes a sheet of paper that has an adhesive partially coated on one side thereof. The sheet of paper is typically an unsaturated paper, which is paper that is not impregnated with a resin. The adhesive is coated as a narrow band adjacent one edge of the sheet, although other embodiments are possible, such as where only corners or other portions (or even all) of the back side of the sheet are coated with RPSA. The paper may be coated with a primer to enhance the anchorage of the adhesive to the substrate. The amount of adhesive on the back side of the repositionable sheet must be sufficient to enable the sheet to adhere to a clean surface.

RPSAs are well known in the art as evidenced by U.S. Pat. Nos. 5,045,569; 4,988,567; 4,994,322; 4,786,696; 4,166,152; 3,857,731; and 3,691,140, the disclosures of which are incorporated here by reference. A RPSA typically comprises polymeric microspheres having an average diameter of at least about one micrometer. The microspheres are inherently tacky and typically comprise at least about 70 parts by weight of an alkyl acrylate or alkyl methacrylate ester. A majority of the microspheres may contain interior voids, typically, at least about 10 percent of the diameter of the microsphere. RPSAs are tacky to the touch and typically demonstrate a peel adhesion of approximately 10 to 300 gram/centimeters (g/cm), more typically approximately 50 to 250 g/cm, and even more typically about 70 to 100 g/cm. Peel adhesion can be determined according to the test outlined in U.S. Pat. No. 5,045,569. A RPSA can be applied to a sheet using known methods including making a suspension of the microspheres and applying that suspension to the sheet by conventional coating techniques such as knife coating or Meyer bar coating or use of an extrusion dye (see U.S. Pat. No. 5,045,569 at column 7, lines 40–50). Other methods to create repositionable adhesive coatings are well known in the art and may include: printing a fine pattern of adhesive dots; selective detackification of an adhesive layer; and incorporating nontacky microspheres in an adhesive matrix. Other useful adhesives include high peel adhesives that may permanently attach a note. Examples of such adhesives include rubber resin and acrylic adhesives.

Figure 3:
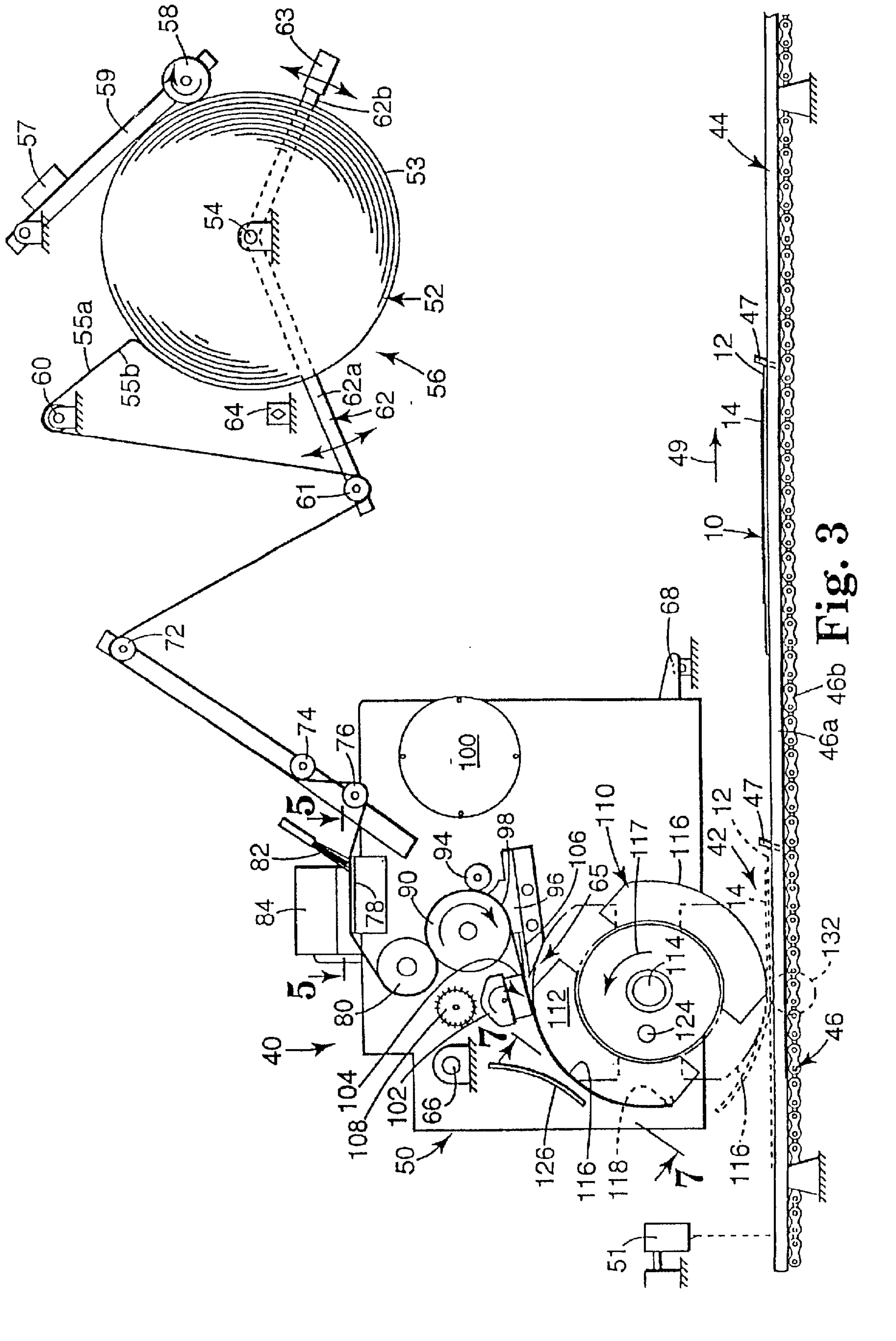
FIG. 3 is a schematic front elevational representation of apparatus 40 in accordance with the present invention.

FIG. 3 illustrates an apparatus 40 useful for forming and applying repositionable sheets in registry onto a series of moving articles. The apparatus 40 includes an article conveyor path and a repositionable sheet transport path. The two paths converge at an application station (indicated generally as at 42) where a cut repositionable sheet is adhered to each article. The apparatus 40 includes a base unit 44 which serves to hold the supply of articles (e.g., advertising pieces 12) for processing. The base unit 44 includes an article conveyor 46 for sequentially transporting articles from one end of the base unit to the other, and in particular, across application station 42. Article conveyor 46 may include a belt conveyor **46*a*, chain link conveyor 46*b*, or other suitable conveyance devices (e.g., rollers, etc.) which may further include article spaced alignment tabs 47 for engaging a leading end of an article 12 and positively positioning it relative to the application station 42. The article conveyor 46 is driven by a conveyor drive motor 48 to move articles in direction of arrow 49 in FIG. 3. After processing at the application station 42**, the articles are further conveyed to a receiving area (not shown) where they are collected for further processing and/or distribution. A base unit for this purpose, which includes a conveyor for materials like advertising pieces, flyers or magazines, is the Kirk-Rudy Model 215 labeling base, available from Kirk-Rudy, Inc. of Kennesaw, Ga.

An optical sensor 51 is supported by the base unit 44 over the process path followed by the articles 12. The optical sensor 51 generates a signal when it detects the presence of an article 12 thereunder. The signal is provided to a process controller 86 (see FIG. 4) for use in controlling operation of the apparatus 40, as discussed subsequently. Preferably, the optical sensor is a photosensor such as an Eaton sensor; Cutler Hammer, Comet Series, Series A2, 95015.

The base unit 44 also serves to support a sheet applicator head 50, and a supply of linerless repositionable sheeting 52 which is elongated in a longitudinal orientation. The sheeting 52 is provided in a roll 53 which is rotatably mounted on a spindle 54 which, in turn, is supported by suitable means on the base unit 44 (alternatively, the spindle 54 may be supported by the head 50). The repositionable sheeting 52 is referred to as "elongated" because it is not yet cut into a number of discrete repositionable sheets, and thus the length of the elongated repositionable sheeting, as its name implies, is much greater than its width. The term "linerless" is used herein to mean an adhesive on a sheet is exposed from the time the sheet is supplied with the adhesive secured thereto (e.g., comes off a supply roll) to an apparatus for adhering the sheet to a substrate and the time the repositionable sheet is adhered to that substrate. A repositionable sheet is not considered to be linerless when a liner covering the adhesive is removed to expose the adhesive just prior to adhering the sheet to a substrate.

The elongated, linerless repositionable sheeting 52 is positioned on the roll 53 with its back or adhesive bearing side **55*a* facing the center of the roll 53 and its top or information bearing side 55*b* facing the periphery of the roll 53. The repositionable cut sheets 14 are cut from the sheeting 52. As such, the back (adhesive-bearing) side 28 of the sheet 14 corresponds to the back side 55*a* of the sheeting, while the top side 30 of the sheet 14 corresponds to the top side 55*b* of the sheeting 52. The top side 55*b* of the sheeting 52 may have a low adhesion back size coating thereon, to facilitate unwinding of the sheeting 52 from the roll 53**. Such a low-adhesion backsize coating may include silicone polymers, fluorocarbon polymers, urethanes, acrylates, and chrome complexes.

The rate of unwinding of the sheeting 52 from the roll 53 is controlled by a supply unwind apparatus 56, which is supported by the base unit 44. Unwind apparatus 56 includes a drive motor 57 which is operably coupled (e.g., by a belt drive) to rotate rubber drive roller 58, which in turn is maintained in surface contact with the circumference of the roll 53 of sheeting 52. The drive motor 57 and drive roll 58 are pivotally supported above the roll 53 by a drive support arm 59, so that as the sheeting 52 is unwound from the roll 53 and the circumference of the roll 53 becomes smaller, the drive roller 58 is maintained (by gravity and the weight of the drive motor 57, drive roller 58 and support arm 59) in surface drive contact with the roll 53, as seen in FIG. 3.

As the sheeting 52 is unwound from the roll 53, it first passes over an idler roller 60 and then a dancer roller 61. Both rollers 60 and 61 are supported by the base unit 44, but the idler roller 60 is held stationary while the dancer roller 61 is mounted for pivotal movement about the axis of the spindle 54 by a first portion 62*a* of a dancer support arm 62. A counterweight 63 is supported by an opposed second portion 62*b* of the dancer support arm 62, as seen in FIG. 3. The weight of the counterweight 63, through the dancer support arm 62, urges the dancer roller 61 upwardly. An optical sensor 64 (supported on the base unit 44) generates a signal when it detects that the dancer support arm 62 has pivoted upwardly to a predetermined position. That signal is provided to the process controller 86, which in turn activates the drive motor 57 to cause rotation of the roll 53 and release additional sheeting 52 from the roll 53. As sheeting 52 is unwound from the roll 53, sheeting-applied tension on the dancer roller 61 will diminish, and the dancer support arm 62 will pivot downwardly and out of its signal generating position. The lack of a signal from the optical sensor 64 will be noted by the controller 86 and the drive motor 57 deactivated. Preferably, the optical sensor 64 is a photosensor such as the Banner Mini-Beam SM312DQG sensor, available from Banner Engineering Corporation, Minneapolis, Minn., and the drive motor 57 is a Balder Industrial motor identified as catalog No. GP7401, available from Balder Electric Co., Fort Smith, Ark.

The elongated, linerless repositionable sheeting 52 travels through a series of rollers which define a process path before reaching a cut station 65, where the elongated sheet 52 is cut transverse to its advance direction in the process path to provide a discrete, cut repositionable sheet 14 of desired length. As used herein, the term “cut” means the sheet has been completely severed from a larger sheeting.

The sheet applicator head 50 is a Kirk-Rudy linerless pressure sensitive stamp affixer which has been modified for use in applying linerless repositionable sheeting. The specific stamp affixer used for this purpose is KR-221–223 LSA stamp head, available from Kirk-Rudy, Inc. of Kennesaw, Ga., which was designed to apply roll form linerless pressure sensitive postage stamps.

The head 50 is supported by suitable means over the base unit 44. Such means may include a transfer drive shaft 66, which is rotatably driven by the motor 48 on the base unit 44, as well as by support bar 68. The shaft 66 and bar 68 are supported by the base unit 44, and extend through or under the head 50. The head 50 is supported over the base unit 44 in this manner to allow its transverse alignment relative to the advancing articles therebelow, and thus allow selective placement of a sheet 14 across the face of the article 12 (as illustrated by double arrows 70 (in axis x) in FIG. 1).

The elongated, linerless repositionable sheeting 52 is unwound from roll 53 through the process path by passing over the idler roller 60 and dancer roller 61 as discussed, and then over a series of idler rollers 72, 74 and 76. The process path is then defined by a back-up plate 78 and idler roller 80. The rollers 72, 74, 76 and 80 and back-up plate 78 are all supported on the head 50. A sheet uncurling bar (or bars) may also be disposed in the process path to remove tendencies of the sheeting 52 to curl after cut into individual cut sheets 14.

Figure 5:
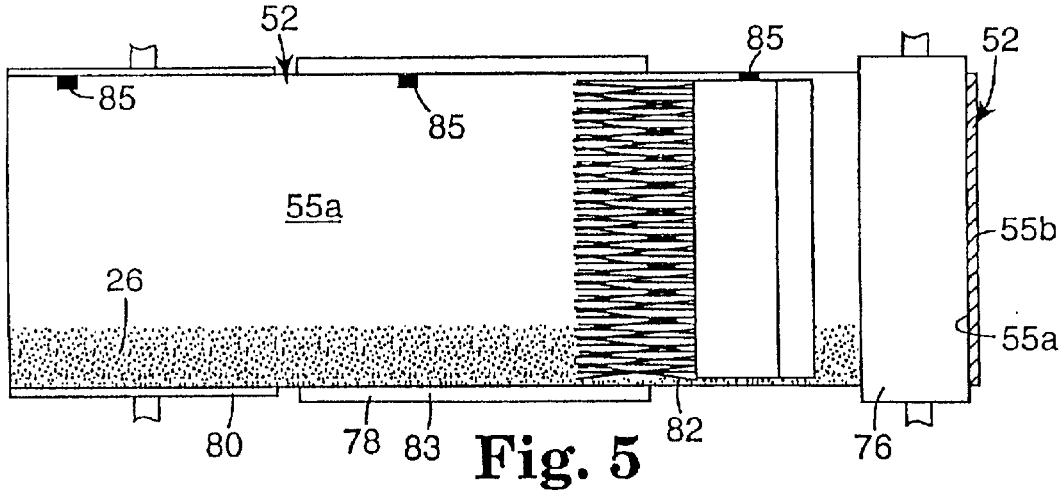
FIG. 5 is an enlarged detail view as taken along lines 5—5 in FIG. 3.

The rollers 76 and 80 are positioned so that the sheeting 53 is urged against the back-up plate 78 disposed therebetween (see FIGS. 1 and 5). A hold-down brush 82 supported by the head 50 is disposed adjacent the back-up plate 78 and against the back side 55*a* of the sheeting 52 to further urge the top side 55*b* of the sheeting 52 against the back-up plate 78 as it passes thereover. The back-up plate 78 has a generally planar face 83 (FIG. 5) over which the sheeting 52 traverses.

An optical sensor 84 is also supported by the head 50, and is disposed immediately downstream of the brush 82 along the process path, and opposite the face 83 of the back-up plate 78. The sheeting 52 thus passes between the back-up plate 78 and optical sensor 84.

Figure 4:
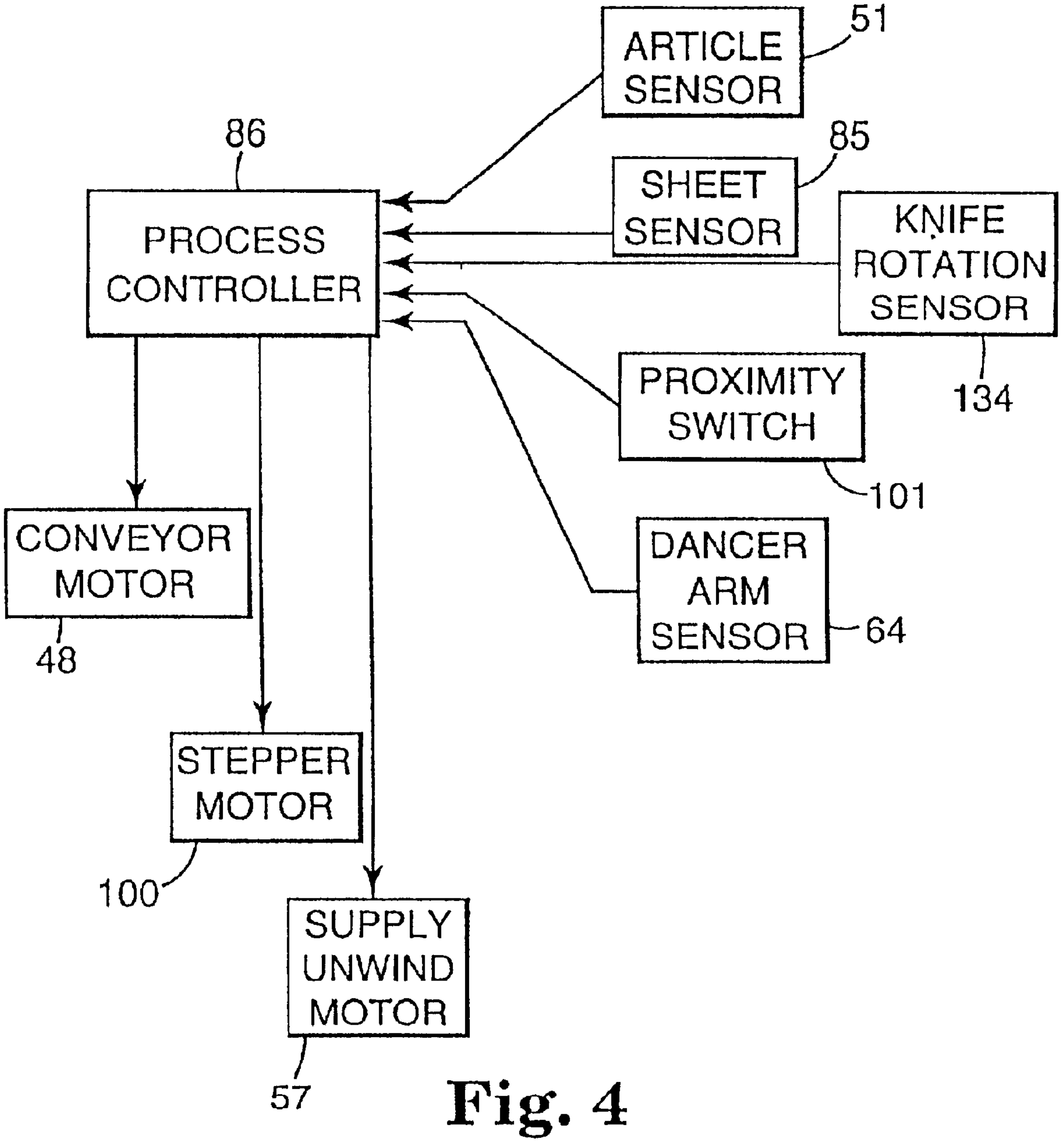
FIG. 4 is a schematic of the control system for the apparatus 40 of the present invention.

In the case of paper sheeting used to produce cut sheets 14 resembling POST-IT® brand notes (commercially available from Minnesota Mining and Manufacturing Company of St. Paul, Minn.), a series of equally spaced (and preferably identically shaped) eyemarks 85 are printed on the back side 55*a* of the sheeting 52 (as seen in FIG. 5). The optical sensor 84 is positioned to illuminate and detect the presence of the eyemarks 85 as the sheeting 52 is advanced along the process path. Upon detecting an eyemark 85, the sensor 84 provides a signal to a process controller 86 (FIG. 4). The brush 82 serves to hold the sheeting 52 in alignment on the back-up plate 78, and reduce possible flutter or canting of the sheeting 52, thereby permitting precise readings of the eyemarks 85 by the optical sensor 84 as the sheeting 52 is advanced along the process path. Preferably, the optical sensor 84 is a photoelectric sensor such as a BANNER Mini-Beam SM312CVGQD sensor, available from Banner Engineering Corporation, Minneapolis, Minn.

Figure 6:
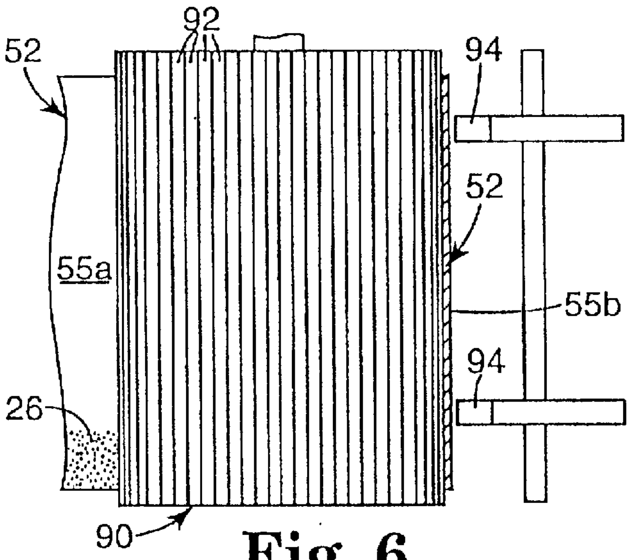
FIG. 6 is an enlarged detail view of the drive roller 90 in FIG. 3.

After passing over the idler roller 80, the sheeting 52 then passes around a drive roller 90. The drive roller 90 is preferably formed from aluminum, and engages the back or adhesive bearing side 55*a* of the sheeting 52, and has its circumferential surface formed in a manner (such as grooves 92) so that it presents sufficient surface to engage and advance sheeting 52 along the process path, but does not present such a surface that allows the adhesive 26 to become adhered thereto instead of continuing to allow the sheeting 52 to be advanced. As best shown in FIG. 6, the elongated, linerless repositionable sheeting 52 is firmly pressed against drive roller 90 by one or more pinch rollers 94, so that sheeting 52 does not slip when the drive roller 90 advances the elongated, linerless repositionable sheeting 52. It is important that the elongated, linerless repositionable sheeting 52 not slip when the drive roller 90 advances, otherwise the sheeting 52 would not be cut to the proper size and some of the information printed on the top side 55*b* thereof may be severed from the cut repositionable sheet 14. Preferably, the pinch rollers 94 do not urge portions of the sheeting 52 bearing adhesive 26 against the drive roller 90. A sheet guide 96 is also provided adjacent the drive roller 90 to aid in feeding the sheeting 52 along the process path and into the cut station 65. The sheet guide 96 has a curved face 98 which is radially spaced from the circumference of the drive roller 90 a distance sufficient to permit sheeting 52 to pass therebetween, as seen in FIG. 3. The pinch rollers 94 and sheet guide 96 are also supported by the head 50.

The drive roller 90 is driven by a stepper motor 100 mounted on the head 50, preferably a SLO-SYN® synchronous stepping motor, model M093-FD-8014, available from Superior Electric, Bristol, Conn. Activation of the stepper motor 100 is in turn controlled by signals provided by the process controller 86. More specifically, the stepper motor 100 is activated by a signal from a proximity switch 101 (FIG. 4) which serves to coordinate the advance of articles 12 and sheeting 52. The proximity switch 101 detects rotation of a shaft (not shown) on the head 50 which is rotatably driven via the transfer drive shaft 66 (which is, in turn, driven by the base unit conveyor motor 57). The proximity switch 101 is preset to detect a rotation position of the shaft that then coordinates activation of the stepper motor 100 with the advance of articles 52 into the application station 42. When the stepper motor 100 is activated, the process controller 86 also signals the supply unwind motor 57 to permit a like amount of sheeting 52 to be dispensed from the roll 53 as it is advanced by the drive roller 90. The stepper motor 100 is deactivated by the process controller 86 when an eyemark 85 is detected by the photosensor 84.

From the drive roller 90, the process path enters the cut station 65, where the elongated, linerless repositionable sheeting 52 is cut along a line transverse to the direction of its advancement into a plurality of sequentially formed, discrete repositionable sheets 14. With the exception of the very first sheet cut from the elongated, linerless repositionable sheeting 52, each cut may define the trailing edge of the immediately cut sheet and the leading edge of the next cut sheet. Thus, virtually all of the linerless repositionable sheeting is used to form cut repositionable sheets, and the generation of excess waste is avoided. In addition, no elongated sheeting remains which exits the apparatus after the sheeting has been cut, and thus no take-up reel is necessary to gather residual or unused elongated sheeting or liner.

At the cut station 65, a rotary knife 102 is mounted on the head 50. The rotary knife 102 has a cutting edge 104 which acts against opposed anvil 106 to sever the sheeting 52 disposed therebetween. The anvil 106 is supported by the head 50 and serves to support the sheeting 52 as it exits the drive roller 90 and sheet guide 96. Each cut by the knife 102 is made after advancement of the sheeting 52 a desired length to define a repositionable sheet 14. During each rotation of the knife 102, the blade 104 also passes across a blade cleaning roll 108, which serves to wipe the blade 104 clean of any adhesive or sheeting material carried thereby. The blade cleaning roll 108 is preferably formed from felt or some other suitable material for wiping the blade 104 as it passes.

Drive roller 90 is selectively rotated to advance the elongated, linerless repositionable sheeting 52 through the cut station 65 on the process path defined on the head 50. After the sheeting 52 has advanced, the blade 104 of the rotary knife 102 is rotated past the anvil 106 to sever a cut sheet 14 from the leading portion of the elongated, linerless repositionable sheeting 52. As the rotary knife 102 is cutting the sheeting 52, a rotary transfer assembly 110 moves into place under the cut sheet 14. Rotary transfer assembly has a transfer head 112 which is aligned to rotate about a central drive shaft 114. The transfer head 112 has an arc-shaped platen face 116 which is rotated through the cut station 65 and transfer station 42 in direction of arrow 117. As the transfer head 112 passes through the cut station 65, its platen face 116 engages the nonadhesive side 30 of the cut sheet 14. The transfer head 112 has a vacuum chamber (not shown) therein, which is coupled to one or more vacuum pickup ports 118 on the platen face 116. A vacuum manifold 122 is also coupled to a chamber in the transfer head 112 adjacent the shaft 114, and the manifold 122 is further coupled to a vacuum source by suitable means, such as tubing 124. As is conventional, a vacuum is drawn through the tubing and manifold on a constant basis, but the chamber and thus vacuum pickup ports 118 are shielded during rotation of the transfer head 112 so that a negative pressure is drawn through vacuum pickup ports 118 only when desired (from the time cut sheet 14 is picked up at the cut station 65 until it is laid down at the application station 42). As the leading edge 120 of the transfer head 112 rotates through the cut station 65, it becomes aligned with a leading edge 130 of cut sheet 14. When that alignment is attained, a vacuum is drawn through vacuum pickup ports 118 to pull sheet 14 down against the platen face 116 and secure it thereto (see FIG. 7). Continued rotation of the transfer head 112 (in the direction of arrow 117) thus carries the cut sheet 14 from the cut station 65 to the application station 42. A spring steel sheet guide 126 is aligned on the head 50 and adjacent the path traversed by the platen face 116 of the transfer head 112 to further prevent the dislodgement of the cut sheet 14 from the platen head 116.

As the leading edge 120 of the platen face 116 approaches the article 12 (which is also entering the application station 42), the suction through vacuum pickup ports 118 is cut off to release the cut sheet 14 from the transfer head 112. The adhesive 26 on the back side 28 of the cut sheet 14 adheres to the cover 16 of the article 12 to engage it thereto. The article 12 continues to advance (by operation of conveyor 46) through the application station 42, and the transfer head 112 continues to rotate, thereby pressing or wiping the cut sheet 14 against the cover of the article 12 and further enhancing the adhesion of adhesive 26 therebetween.

A driven back-up roll 132 is supported by the base unit 44 to further define a nip through which the cut sheet 14 and article 12 must pass in the application station 42 to facilitate this bonding process. The transfer head 112 and back-up roll 132 are driven by the base unit conveyor motor 48. The operative coupling of the drive shaft 114 for the transfer head 112 (on the head 50) and the conveyor motor 48 (on the base unit 44) is accomplished via the transfer drive shaft 66 mounted between the base unit 44 and head 50. After depositing a cut sheet 14 in the application station, the transfer head 112 continues to rotate (in direction of arrow 117) back to the cut station 65 and into position to accept another cut sheet 14 for pickup, transfer and application to another article 12. This process is continued as desired until the appropriate number of promotional assemblies 10 are formed. In each assembly 10, the cut sheet 14 will be applied in the same position ("registration") relative to the cover 16 of the article 12, thus establishing a very uniform and reliable set of promotional assemblies 10. The transfer head 112 preferably has two platen faces 116, opposed by 180°, so that for each rotation of the transfer head 112, two cut sheets 14 are moved from the cut station 65 to the application station 42.

Figure 7:
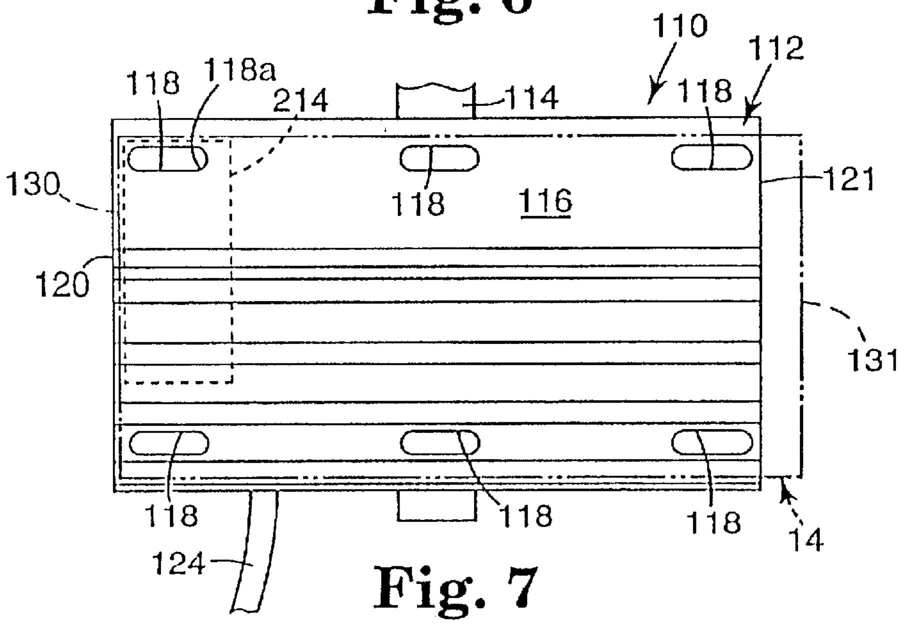
FIG. 7 is an enlarged detail view as taken along line 7—7 in FIG. 3.

In the case illustrated by FIG. 7, the sheet 14 is longer than the platen face 116 (trailing edge 121 of platen face 116 is overlapped by trailing edge 131 of sheet 14). The sheet 14 is released by the transfer head 112 just prior to entering the application station 42 so that as the transfer head 112 rotates, it wipes the entire sheet 14, out to its trailing edge 131. This may also be accomplished by setting the conveyor 46 for overtravel relative to the moving transfer head 112.

The rotary knife 102 is also driven by the base unit conveyor motor 48. Again, the operative coupling of the rotary knife (on the head 50) and the conveyor motor 48 (on the base unit 44) is accomplished via the transfer drive shaft 66 mounted between the base unit 44 and head 50. A mechanical clutch (not shown) is disposed between the transfer drive shaft 44 and the rotary knife. That clutch is engaged by the process controller 86 when the photosensor 51 detects an advancing article 12 to rotate the knife 102. A knife rotation sensor 134 (FIG. 4) monitors the rotation of the knife 102, and momentarily disengages the clutch when the blade 104 is closely spaced to the anvil 106 to allow sufficient sheeting 52 to be advanced therebetween (to define the desired cut length for the cut sheet 14) before the blade 104 reaches the anvil 106 to make a cut.

As mentioned above, the apparatus is controlled by a process controller 86, based upon preset inputs (e.g., desired length of cut sheet 14, desired registration position of sheet applied on article 12 (both in the x-axis and the y-axis, as seen in FIG. 1), as well as in-process signals from optical sensors 51 and 84, and the knife rotation sensor 134 and the proximity switch 101. The process controller 86 thus activates the motors 48, 57 and 100, dependent upon the preset conditions and in-process signals to continually, uniformly and sequentially apply each cut sheet 14 in the same relative position on an article 12. With this apparatus, it is possible to create, for example, up to 15,000 identical promotional assemblies 10 per hour (with each cut sheet 14 having a length of 3 inches). Reducing the length of the cut sheet to one inch allows processing of up to 30,000 assemblies 10 per hour, and even faster processing times are contemplated. Conventional magazine binding equipment typically runs in the range of 9–10,000 articles per hour, and thus the disposition of the apparatus of the present invention and its method along a magazine binding line will not inhibit normal processing, and the result will be a bound magazine bearing a partially coated RPSA sheet on at least one page thereof.

In short, and with reference to FIGS. 3–7, the apparatus of the present invention performs the following steps to adhere a cut repositionable sheet 14 to an advertising piece 12. First, the base unit conveyor motor 48 is activated to initiate conveyance of articles 12 sequentially through the application station 42. As sensor 51 detects an approaching advertising piece 12, it relays a signal to process controller 86, which in turn activates the rotary knife 102 clutch so that the knife 102 rotates for cutting. The proximity switch 101 detects rotation driven by the base unit conveyor motor 44 and activates the motor 100 to rotate drive roller 90 to advance the elongated, repositionable sheeting 52. As sheeting 52 is pulled from the supply roll 53, the dancer support arm 62 will move upwardly to be detected by optical sensor 64. The sensor 64 will relay a signal to the process controller 86, which in turn activate the drive motor 57 (as necessary) to facilitate the unwinding of sheeting 52. The supply unwind apparatus 56 thus serves to attenuate the otherwise incremental advance of sheeting 52 from the roll 53.

As the sheeting 52 traverses the process path, the sensor 84 detects an eyemark 85 on the back side 55*a* of the elongated repositionable sheeting 52. Sensor 84 relays a signal to the process controller 86, which in turn deactivates the motor 100 to stop the rotation of drive roller 90 and advance of the sheeting 52 along the process path. Rotation of the rotary knife 102 was momentarily stopped by knife rotation sensor 134 to permit the desired length of sheeting 52 to pass by the knife 102 prior to its severing the leading portion of the elongated repositionable sheeting 52 into a cut sheet 14. The transfer head 112 of the rotary transfer assembly 110 is rotated to a position below the just cut sheet 14, and a negative pressure drawn through vacuum ports 118 to adhere the cut sheet 14 to the platen face 116 of the transfer head 112. The transfer head 112 continues to rotate, approaching the application station 42. As the leading edge of the cut sheet 14 comes into registration and contact with the face of the article 12, the negative pressure is released, thereby releasing the cut sheet 14 from the platen face 116. The adhesive 26 on the cut sheet 14 engages the article 12 as it moves through the application station 42. The transfer head 112 continues to rotate and the platen face 116 presses or wipes the cut sheet 14 onto the article 12, backed up in this position by the driven back-up roller 132. The advertising piece 12 and sheet 14 adhered thereon (now a promotional assembly 10) continue to advance in the direction of arrow 49 (via conveyor 46) to exit the apparatus. This process is repeated over again to register and adhere each cut repositionable sheet 14 to an advertising piece 12. Once applied, the cut sheet 14 adheres via adhesive 26 to the article 12, but as mentioned above, the adhesive is RPSA and thus the cut sheet 14 may be removed and re-adhered to the article 12, or removed for placement on an alternative clean surface (e.g., desk, refrigerator or for use, for example, as a coupon).

The elongated, linerless repositionable sheeting can be formed from a bond paper, preferably having a basic weight of 15 to 25 pounds. Such paper is provided in elongated, roll form, and then cut into separate note sheets by the inventive apparatus. Typical properties of such sheets include a caliper of 0.002 to 0.009 inches (51 to 229 microns), and an adhesive area covering a portion of one surface of the sheet. The adhesive may cover from 10 percent to 90 percent of the surface, preferably between 20 percent to 75 percent, and more preferably between 15 to 50 percent. The adhesive may be coated as a continuous stripe along an edge or be coated in a discontinuous pattern, such as lines of adhesive dots. Each sheet preferably bears a strip of RPSA along one edge thereof on its back side, while on its top side, each sheet bears preprinted indicia or images. Preferably, only a minor portion of the back side of the cut sheet may bear RPSA. The top (nonadhesive bearing) side of the sheeting may be coated with a release layer to facilitate the unwinding of the roll.

The indicia or image borne by the sheets is preferably the same for each cut sheet. Thus, the elongated sheeting material (prior to cutting) bears a repeating pattern of the same indicia or image along its length. The pattern repeats in equal length segments, with each segment designed to be cut into a separate cut sheet.

The sheeting may also contain a line or path of weakness (such as perforations) generally parallel to the adhesive so that a portion of the sheet (without adhesive) could be separated from that portion of the sheet bearing adhesive. Thus, the nonadhesive portion can be torn away from the adhesive portion (which may remain on the article). This embodiment may be particularly useful for coupons or return mail postcards.

The eyemarks printed on the back of the sheeting are used to define the cut length and control parameters for the apparatus. Preferably, the eyemarks are positioned along what would be the cut line between adjacent cut sheets on the elongated sheeting, so that after cutting, half of each eyemark is borne by subsequently cut adjacent sheets.

Typically, a cut note sheet will be cut by the inventive apparatus to a size of less than 100 square inches (645 $cm^2$). More typically, cut sheets have a size in the range of 1 to 30 square inches (6 to 194 $cm^2$), and even more typically in the range of 2.5 to 25 square inches (16 to 161 $cm^2$). Cut repositionable sheets frequently measure about 3 inches by about 5 inches (7 by 13 cm) or about 4 inches by about 6 inches (10 by 15 cm). Another common size is about 1.5 inches by about 2 inches (3 cm by 5 cm). Using the present apparatus, typical cut lengths for each cut sheet range from 1 to 6 inches.

In the present apparatus, it is contemplated that rolls of sheeting material up to 20 inches in diameter can be accommodated (depending upon the thickness of the sheeting material) and may provide a supply of sheeting material having a generated length of about 2300 lineal yards (about 2100 meters). For such a roll having a width of about three inches, the rollers 60, 61, 72, 74, 76, 80 and 90, plate 78 and applicator head 112 have widths (transverse to the process path) of about 3.25 inches.

In the inventive apparatus, the optical sensor 84 which is employed to detect the eyemarks 85 is a sensor suitable for detecting changes in opacity. Thus, dependent upon the color of the sheeting, the eyemark may be darker or lighter than the sheeting color, so long as the change in contrast between the eyemark and sheeting substrate color is sufficient to generate a detection signal by the optical sensor 84. Typically, the eyemark will be a mark made with black ink, such as illustrated in FIG. 5.

For a sheeting material which results in a cut paper sheet similar to a POST-IT® brand note, the sheet substrate is an opaque paper. Printing is required on both sides of the sheeting to deposit the eyemarks on the back side thereof and the preprinted indicia or image on the top side thereof. In addition to opaque or paper cut sheets, such as POST-IT® brand notes, the present invention is also applicable to other sheet structures. The sheeting material may be conventional bond or clay-coated paper, carbonless paper, a polymeric sheet material or even a metallic foil. Further, transparent or translucent substrate materials (i.e., light-transmissive) such as those used for POST-IT® brand tape flags sold by Minnesota Mining and Manufacturing Company, St. Paul, Minn., are also possible sheeting materials.

A tape flag is a discrete, flexible sheet which has a first major side and a second major side. On its first major side (back side), RPSA is provided adjacent a first end of the elongated sheet (typically on at least half or a major portion of the back side of the sheet). Adjacent its second end, the tape flag is provided with a visible indicator of contrasting color. This may be an inked color covering a tab portion of the second end of the sheet (on either side thereof) or a preprinted image or message (such as “Sign Here”). Tape flags are typically used as temporary indicators of pages in books or documents, or portions of documents to be noted by a reader. That portion of the tape flag which bears RPSA is sufficiently transparent when adhered to a page so that underlying text on the page may be perceived and read. Often, an indicator image (such as an arrow) is printed on this first transparent portion of the tape flag to enhance its use as an indicator of sections of a page to which it is adhered.

Because of the transparent nature of a portion of the tape flag, the preprinted indicia or image thereon itself can serve as an eyemark for tape flags dispensed and applied using the apparatus of the present invention. This is more fully described in connection with FIGS. 8–11 and FIG. 3.

Figure 8:
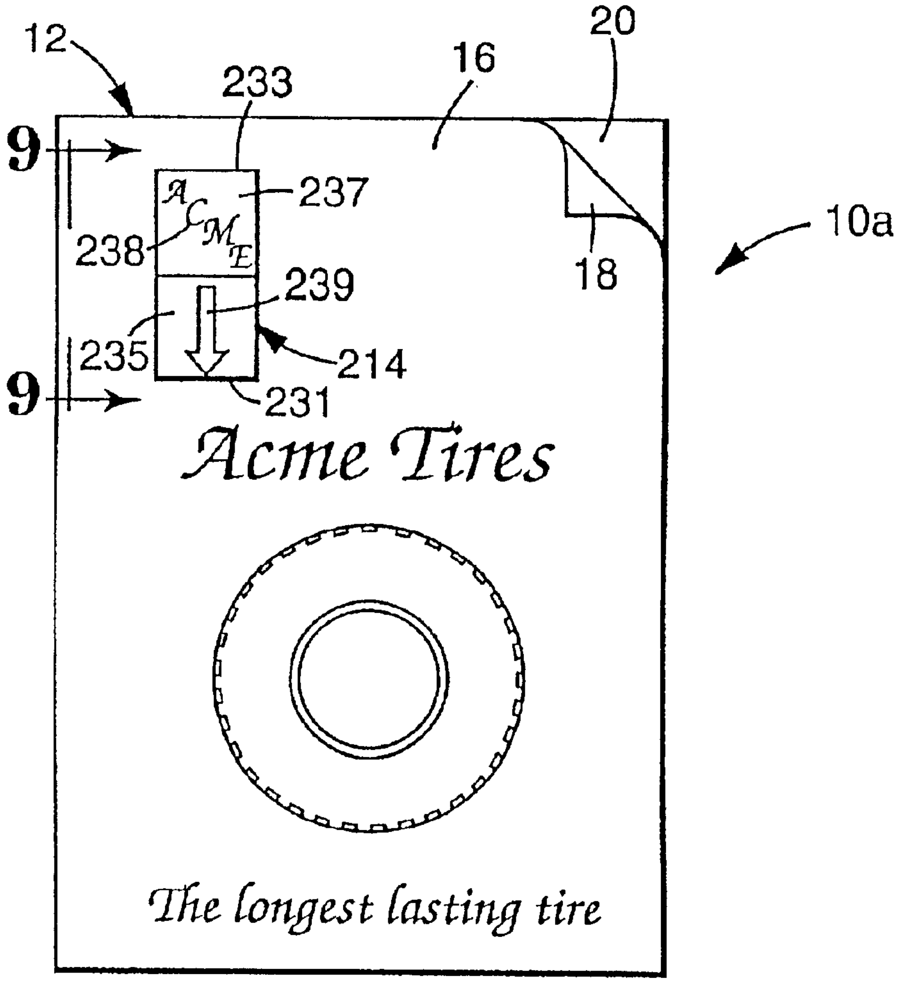
FIG. 8 is a front view of an advertising piece 12 having a repositionable sheet (tape flag) 214 adhered to the cover 16 thereof.
Figure 9:
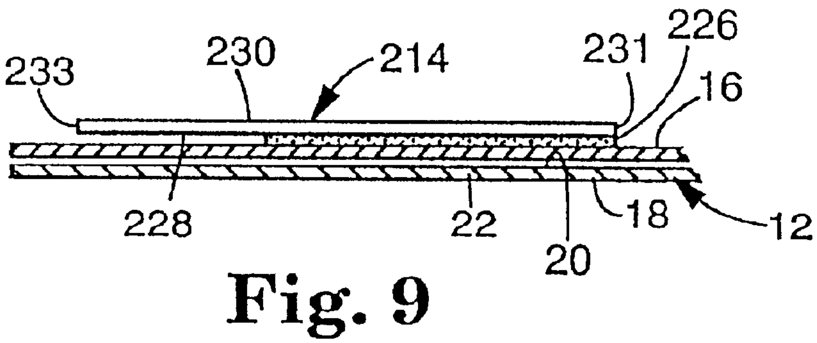
FIG. 9 is a sectional view as taken along lines 9—9 in FIG. 8.

FIGS. 8 and 9 illustrate a promotional assembly **10*a* that includes an advertising piece 12 and a repositionable sheet 214. The advertising piece is, for illustrative purposes, the same as that shown and described previously, and again can be any article suitable for mounting a repositionable sheet thereon. As seen in FIG. 9, repositionable sheet 214 is again secured directly to the advertising piece 12 by RPSA 226 coated partially on the first or back side 228 of the sheet 214 (with the RPSA 226 preferably coated over 25 to 75 percent of the back side 228). Repositionable sheet 214 has a second or top side 230. Ink of a contrasting color or a preprinted message may be printed on either side of the sheet 214 (if printed on the first side 228**, the RPSA is applied over the printing).

Each sheet 214 (as a tape flag) is typically elongated (with a length ranging from 1 to 3 inches), with a first end 231 and a second end 233. The substrate polymer material for the sheet 214 is flexible and generally transparent, as is the RPSA (disposed adjacent the first end 231). Thus, when the sheet 214 is adhered to an article 12, underlying indicia or images on the article face can be seen through a first transparent or read-through section 235 of the sheet 214. Adjacent its second end 233, the sheet 214 will bear a visually distinctive color ink in a second substantially opaque section 237, which is useful in calling attention to portions of the article 12 (and/or the second section 237 may include a printed message 238). The sheet 214 may also include an arrow or other indicator 239 printed on the first section 235 thereof. In one embodiment, the tape flag sheet is formed from cellulose acetate, such as disclosed in Miles et al. U.S. Pat. No. 4,907,825, which is incorporated by reference herein. In another embodiment, the tape flag sheet is formed from biaxially oriented polyethylene terephthalate (PET). In either case, the tape flag sheet may have a thickness ranging from 0.001 inch to 0.005 inch, and more preferably 0.002 inch.

Figure 10:
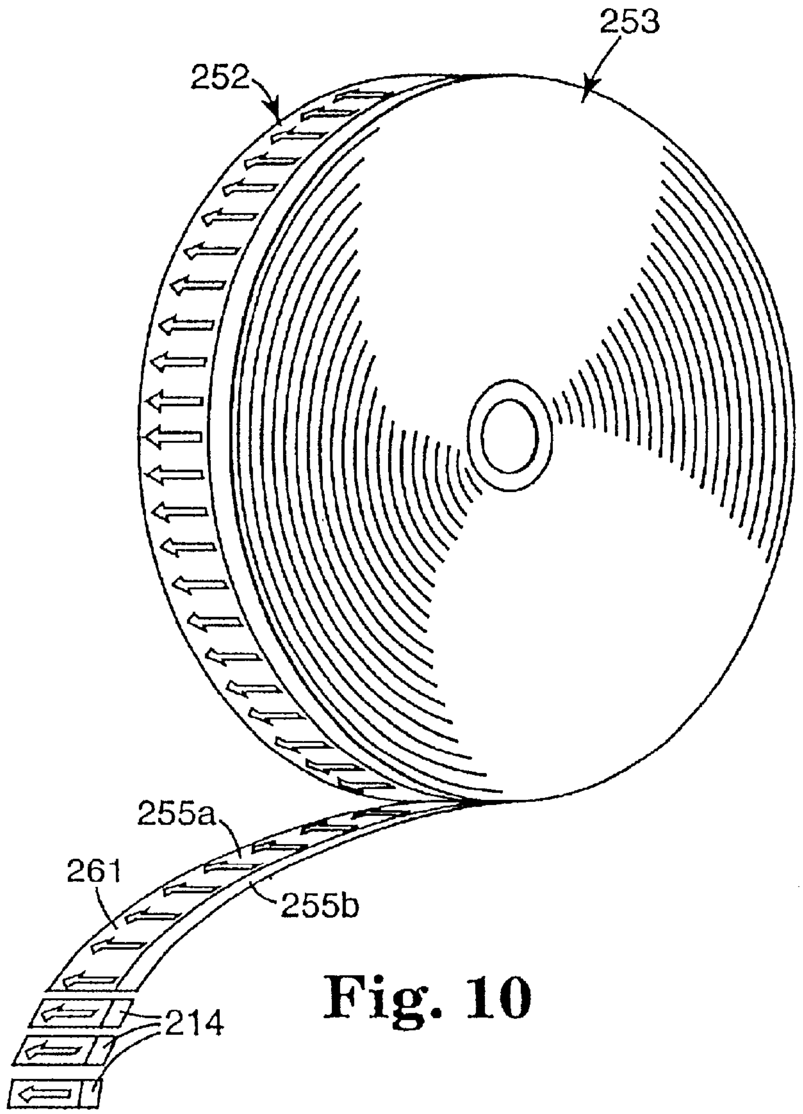
FIG. 10 is a perspective view of a roll of elongated, linerless repositionable sheeting of tape flag material.

The physical handling of the tape flag sheeting in the apparatus 40 of the present invention to effect sequential registration and application of cut tape flag sheets 214 onto the articles 12 is the same as described previously for paper cut sheets 14, except that the preset parameters (e.g., cut length of sheet 214) may be different. Sheeting 252 is provided in the form of a roll 253, as illustrated in FIG. 10. The sheeting 252 has a back adhesive bearing side **255*a* facing the center of the roll 253 (which corresponds to back side 228 of sheet 214), and a top or information readable side 255*b* towards the periphery of the roll 253 (which corresponds to top side 230 of sheet 214). The sheeting 252 traverses the process path through apparatus 40 in the same manner as previously described, with its adhesive side 255*a* facing drive roll 90, and its nonadhesive side 255*b* ultimately engaged by transfer head 112. The arrows 239 are repeatedly printed along the length of the sheeting 252, one for each cut sheet 214 to be severed therefrom. Because a portion of the sheeting 252 is generally transparent (portion 261 (FIG. 10), corresponding to first section 235 of cut tape flag sheet 214), the arrows 239 are visible on either side of the sheet (regardless of which side the arrows 239 are printed on), and thus can serve as the eyemarks 285 for the tape flag sheeting 252. Other contrasting patterns or indicator marks printed on the sheeting 252** can also serve as the registration means (eyemarks) so long as they are sufficiently detectable.

Figure 11:
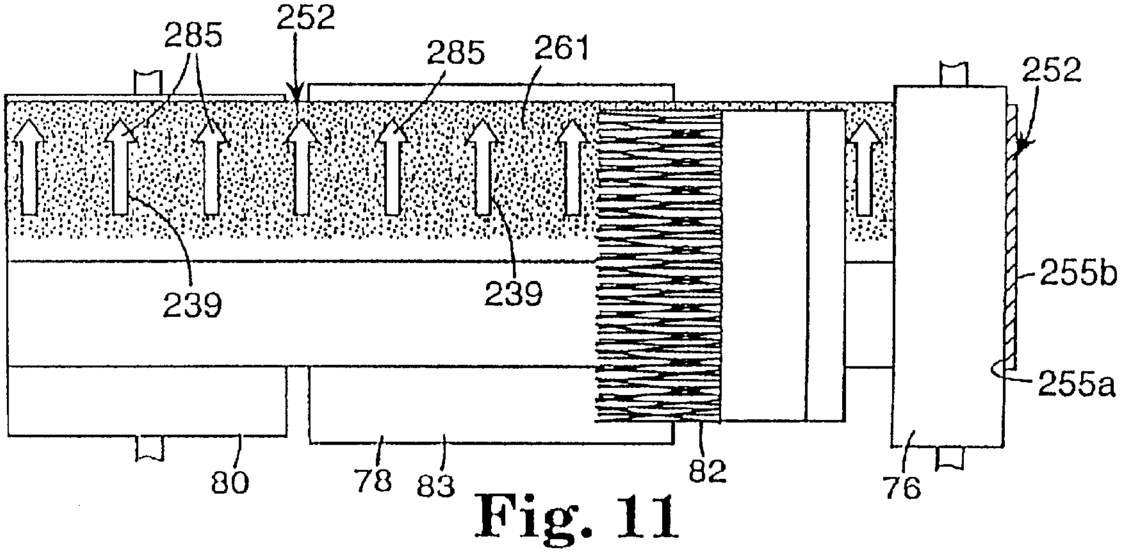
FIG. 11 is an enlarged detail view of the inventive apparatus such as FIG. 5, but substituting an elongated linerless tape flag sheeting for the elongated note sheeting shown in FIG. 5.

A portion of the sheeting 252 is shown in FIG. 11 as disposed for detection of eyemarks 285 by optical sensor 84. The tape flag sheeting 252 extends between rollers 76 and 80, and across the face 83 of back-up plate 78. The brush 82 aids in holding the sheeting 252 flat against the back-up plate 78 for eyemark 285 detection by optical sensor 84 disposed thereabove (see FIG. 3). The arrows 239 present a sufficient contrast to the transparent portion 261 of the sheeting 252 to permit detection and signal generation by optical sensor 84. The signal generated by optical sensor 84 is provided to the process controller 86, and again serves to register the tape flag sheeting for advancement and cutting into discrete cut sheets 214, and ultimately for application onto the articles 12.

Conventional tape flags are relatively narrow, and may range in width from 0.4 inch to 2 inches, and more preferably, about 1 inch. Using the apparatus 40, one inch wide (or long as viewed in direction of advancement through the process path) cut sheets are possible. For narrow width cut sheets of this type, some of the vacuum pickup ports 118 may be covered (i.e., masked by the application of adhesive tape) so that a vacuum is drawn only through those ports that are presented to the cut sheet at the cutting station (e.g., in FIG. 7, port 118*a* for cut sheet 214). Relatively long lengths of sheeting may be processed into tape flags individually disposed on articles. For example, a roll of tape flag sheeting up to 14 inches in diameter can be processed, which would represent a generated length of about 1800 yards (1645 meters).

One fundamental objective of the inventive method and apparatus is the formation of a multitude of identically registered promotional articles, where the cut sheet is adhered to the article in precisely the same location every time. The system sensing and control means described are thus provided to apply the cut sheet in register to the article (e.g., a magazine signature). In part, the degree of registration is controlled using register marks or eyemarks. The present inventive method and apparatus can provide a predetermined degree of registration between the cut sheet and article of +/− one inch in any direction (x and y, as noted in FIG. 1); preferably, the degree of registration attained is +/−0.33 inch in any direction (a tolerance known as "loose register"); more preferably, the degree of registration attained is +/−0.125 inch in any direction; and most preferably, the degree of registration is +/−0.03125 inch in any direction (a tolerance known as "lap register"). These registration criteria are possible at all run rates of the inventive apparatus and method, including specifically run rates faster (over 3,000 assemblies per hour) than any known process or apparatus, run rates as fast (about 9,000 to 10,000 assemblies per hour) as conventional magazine binding equipment operates, and even faster run rates.

"Registration" is a term used in the printing industry relating to the placement of ink or other converting between different stations on the printer or different pieces of equipment. Register marks or eyemarks are indicia (usually separate from the remaining printed graphics of a printed piece) that are typically located along an edge of the printed piece. Such marks may be "crosshairs" (indicia printed as two perpendicular, straight lines intersecting at their midpoints) or may be printed as a simple rectangle. Typically, these marks are cut off when the printed product is finished.

As described, the marks for the present invention may be separately printed on the sheeting (e.g., as in FIG. 5) or may be defined as a portion of the indicia or image printed on the sheeting (e.g., as in FIGS. 10 and 11). This latter approach eliminates printing on both sides of the sheeting (such as when the sheeting is transparent) and minimizes waste of the sheeting material (since no trimming is required), thus improving the overall efficiency of the process and its material usage. While the invention is illustrated by registration means such as visually detectable eyemarks and detecting means therefor such as photosensors, alternative registration and detecting systems are possible. For example, the registration means can be visible, tactile, olfactory, auditory or tasteable, as disclosed in U.S. Pat. No. 5,382,055, which is incorporated by reference herein.

Although the present invention has been described with reference to preferred embodiments, workers skilled in the art will recognize that changes may be made in form and detail without departing from the spirit and scope of the invention.

What is claimed is:

1. A method for dispensing tape flags from a roll of linerless sheet material which is elongated longitudinally, has first and second opposed surfaces, first and second opposed side edges, and which has first and second side-by-side longitudinally extending portions, the linerless sheet material having a repositionable pressure sensitive adhesive on only the first portion of the first surface and being formed from a material that is sufficiently transparent when adhered to a substrate that underlying images on the substrate are substantially visible through the linerless sheet material, the method comprising:

providing a repeating indicia pattern disposed on one of the surfaces of the sheet material, with each of the repeating indicia patterns being sufficiently visible to define first and second indicators when the roll of sheet material is unwound;

visibly detecting the first indicator during processing of the roll to facilitate cutting apart discrete tape flag sheeting segments, of equal length, with each segment having a first side and a second side and bearing one of the repeated indicia patterns thereon; and visibly detecting the second indicator from the second side of each cut segment when that cut segment has its first aide adhered to a surface in order to direct attention to a section of that surface.

2. The method of claim 1 wherein the step of visibly detecting the first indicator includes detecting the first indicator with an optical sensor and generating a detection signal.

3. The method of claim 2 wherein a process controller processes the signal and registers the sheet material for advancement and cutting.

4. The method of claim 1 further comprising:

adhering the first side of a first tape flag sheeting segment to a surface of a first article at a first location with respect to the first article; and adhering the first side of a second tape flag sheeting segment to a surface of a second article at a second location with respect to the second article.

5. The method of claim 4 wherein the first location and the second location are each within a predetermined degree of registration of a desired location of the respective tape flag sheeting segment on the respective article.

6. The method of claim 1 wherein the step of providing a repeating indicia disposed on one of the surfaces of the sheet material includes printing the indicia on the sheet material.

7. The method of claim 1 wherein the step of cutting apart discrete tape flag sheeting segments includes rotating a laterally disposed rotary knife across the sheet material.

8. The method of claim 7, and further comprising the step of:

cleaning the rotary knife during each rotation thereof to inhibit the build-up of adhesive or sheeting material on the knife.

9. A method for dispensing tape flags from a roll of linerless sheet material which is elongated longitudinally, has first and second opposed surfaces, first and second opposed side edges, and which has first and second side-by-side longitudinally extending portions, the linerless sheet material having a repositionable pressure sensitive adhesive on only the first portion of the first surface and being formed from a material that is sufficiently transparent when adhered to a substrate that underlying images on the substrate are substantially visible through the linerless sheet material, the method comprising:

providing a repeating indicia pattern disposed on one of the surfaces of the sheet material, with each of the repeating indicia patterns being sufficiently visible to define first and second indicators when the roll of sheet material is unwound;

visibly detecting the first indicator during processing of the roll to facilitate cutting apart discrete tape flag sheeting segments, of equal length, with each segment having a first side and a second side and bearing one of the repeated indicia patterns thereon;

visibly detecting the second indicator from the second side of each cut segment when that cut segment has its first side adhered to a surface in order to direct attention to a section of that surface;

adhering the first side of a first tape flag sheeting segment to a surface of a first article at a first location with respect to the first article; and adhering the first side of a second tape flag sheeting segment to a surface of a second article at a second location with respect to the second article, wherein the first location and the second location are each within a predetermined degree of registration of a desired location of the respective tape flag sheeting segment on the respective article, wherein the predetermined degree of registration is 0.33 inch in any planar coordinate on the surface of the article.

10. The method of claim 9 wherein the step of adhering the first side of a tape flag sheeting segment to a respective article is repeated more than about 3,000 times per hour by an apparatus.

11. The method of claim 10 wherein the step of adhering the first side of a tape flag sheeting segment to a respective article is repeated more than about 9,000 times per hour by an apparatus.

12. A method for dispensing tape flags from a roll of linerless sheet material which is elongated longitudinally, has first and second opposed surfaces, first and second opposed side edges, and which has first and second side-by-side longitudinally extending portions, the linerless sheet material having a repositionable pressure sensitive adhesive on only the first portion of the first surface and being formed from a material that is sufficiently transparent when adhered to a substrate that underlying images on the substrate are substantially visible through the linerless sheet material, the method comprising:

providing a repeating indicia pattern disposed on one of the surfaces of the sheet material, with each of the repeating indicia patterns being sufficiently visible to define first and second indicators when the roll of sheet material is unwound;

visibly detecting the first indicator during processing of the roll to facilitate cutting apart discrete tape flag sheeting segments, of equal length, with each segment having a first side and a second side and bearing one of the repeated indicia patterns thereon;

visibly detecting the second indicator from the second side of each cut segment when that cut segment has its first side adhered to a surface in order to direct attention to a section of that surface;

adhering the first side of a first tape flag sheeting segment to a surface of a first article at a first location with respect to the first article; and adhering the first side of a second tape flag sheeting segment to a surface of a second article at a second location with respect to the second article, wherein the first location and the second location are each within a predetermined degree of registration of a desired location of the respective tape flag sheeting segment on the respective article, wherein the predetermined degree of registration is 0.03125 inch in any planar coordinate on the surface of the article.

13. The method of claim 12 wherein the step of adhering the first surface of a tape flag sheeting segment to a respective article is repeated more than about 3,000 times per hour by an apparatus.

14. The method of claim 13 wherein the step of adhering the first surface of a tape flag sheeting segment to a respective article is repeated more than about 9,000 times per hour by an apparatus.

* * * * *

UNITED STATES PATENT AND TRADEMARK OFFICE

CERTIFICATE OF CORRECTION

PATENT NO. : 6,773,539 B2 
DATED : August 10, 2004
INVENTOR(S) : Timothy A. Mertens It is certified that error appears in the above-identified patent and that said Letters Patent is hereby corrected as shown below:

Column 2,
Line 47, insert -- now U.S. Patent No. 6,379,764, -- before "which";
Line 50, delete "Minnesota Mining and Manufacturing", insert in place thereof -- 3M Innovative Properties --;

Column 16,
Line 23, delete "aide", insert in place thereof -- side --.

Signed and Sealed this

Nineteenth Day of April, 2005

JON W. DUDAS
*Director of the United States Patent and Trademark Office*